April 9, 1968  E. W. DEAN  3,377,222

WHITE SIDEWALL TIRE

Filed Aug. 18, 1964  2 Sheets-Sheet 1

INVENTOR.
EARL W. DEAN

BY *J. B. Holden*
ATTORNEY

April 9, 1968

E. W. DEAN 3,377,222

WHITE SIDEWALL TIRE

Filed Aug. 18, 1964

INVENTOR.
EARL W. DEAN

BY

*J.B.Holden*
ATTORNEY

United States Patent Office 3,377,222
Patented Apr. 9, 1968

3,377,222
WHITE SIDEWALL TIRE
Earl W. Dean, East Gadsden, Ala., assignor to The Goodyear Tire & Rubber Company, Akron, Ohio, a corporation of Ohio
Filed Aug. 18, 1964, Ser. No. 390,440
9 Claims. (Cl. 156—116)

ABSTRACT OF THE DISCLOSURE

A method and apparatus for building white side wall tires in which the white rubber is applied in narrower width than usual and is covered by the black tread stock in one layer from bead to bead. The white is exposed by a pair of knives set angularly toward each other and toward the tire axis, the setting, depth of cut, and spacing of the knives being adjustable. The white strip is covered with a thin, black, stain-free rubber layer, and the tire is molded and vulcanized to give the outer side wall contour. The thin black layer is buffed off to expose the white side wall ring.

This invention relates to pneumatic tires and more particularly it relates to a white sidewall construction and to an improved method of making a white sidewall and the apparatus utilized in the construction of the new and novel white sidewall tire.

Pneumatic tires have for some time been enhanced in appearance by incorporating a white sidewall on one side of the tire carcass. The early white sidewall tires contained what at this time would be considered a rather wide band of white rubber in that the visible width of white rubber on the completed tire extended from near the tread surface on its outermost periphery and terminated at the rim with its innermost peripheral edge. The visible finished width of the white pigmented rubber has become narrower with the present trend of fashion although a rather wide band of white rubber is still built into the tire, also the manner in which the white sidewall rubber is incorporated into the tire sidewall during the initial construction of the tire has undergone a radical change. Formerly the white rubber was attached to the exterior of the normally black tire carcass. There was great emphasis placed on keeping the white sidewall clean during the entire manufacturing process. Now there is no attempt made to keep the surface of the white sidewall clean during the building phase; in fact, it is common to cover the white sidewall stock entirely with a layer of black cover-strip stock. The black layer is then removed from the completed tire by grinding to expose the desired finished width. In this manner a white surface is produced and also the boundary, or juncture, between the white or black rubber is very clearly delineated, although much of the white pigmented rubber remains covered by black stock and serves no purpose other than to provide a covering for the tire carcass, which could be adequately covered by less expensive black sidewall stock.

A white sidewall tire costs more to manufacture than an all black tire; therefore, any savings in material or in time can be very significant because of the large volume of tires produced. The present invention sets forth a new and novel manner in which the white sidewall tire can be provided while using a minimum of white stock and reducing also to a minimum the amount of black cover-strip rubber that must be used to cover the white sidewall stock prior to unveiling the white portion of the completed tire by grinding through the black rubber to the desired dimensions.

Throughout the specification and the ensuing claims the terms "black" and "white" will be used. Black refers to reinforcing materials such as carbon or other colored pigments that would be suitable for use throughout the overall tire carcass. The term white is used to identify the many different colored materials that could be used in the decorative strip placed in the tire sidewall.

The principal object of this invention is to provide a white sidewall tire utilizing a minimum of white stock therein.

Another object of the present invention is to provide a new and novel method of laying-up an uncured white sidewall tire.

An additional object of this invention is to provide suitable apparatus for carrying out the aforementioned new and novel method of making a white sidewall tire.

These and other objects of the present invention will be readily apparent when considered with the accompanying drawings and claims.

Figure 1:
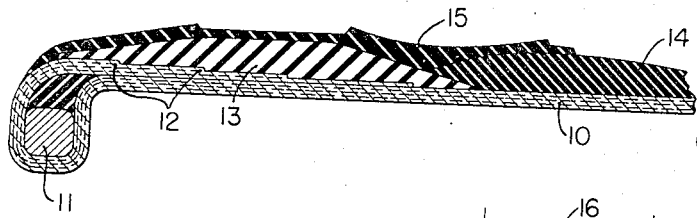
FIGURE 1 shows a fragmentary cross-section of a conventional prior art white sidewall tire carcass as it appears during its initial construction.

With reference to FIGURE 1 the conventional or prior art white sidewall tire is constructed by first placing reinforcement plies 10 on a cylindrical tire building drum (not shown). The number of reinforcement plies may vary, however, for purposes of illustration a typical 4-ply construction is shown. The normal tire is constructed by first placing a ply on a tire building drum. Additional ply layers are superposed thereover with the reinforcing media, or cords therein angularly disposed with respect to the first layer. After reinforcement layers 10 have been positioned on the cylindrical tire building drum and thoroughly stitched in position, the steel reinforcement beads 11 are positioned on the ends of the tire building drum and the reinforcement layers 10 are wrapped around so that ends 12 are laying parallel to and in contact with reinforcement layer 10. The next step in making a white sidewall tire is to place a strip of white sidewall stock 13 on top of wrapped around ends 12 of reinforcement layer 10. After white sidewall stock 13 has been stitched in position, tread stock 14 is placed in abutting relationship with white sidewall stock 13. Tread stock 14 is anchored in place by stitching and a cover-strip 15 of protective black stock is laid over white sidewall strip 13 and tread stock 14. Tread stock 14 not only forms the tread portion of the tire but also extends toward the bead thus forming the sidewall.

Figure 2:
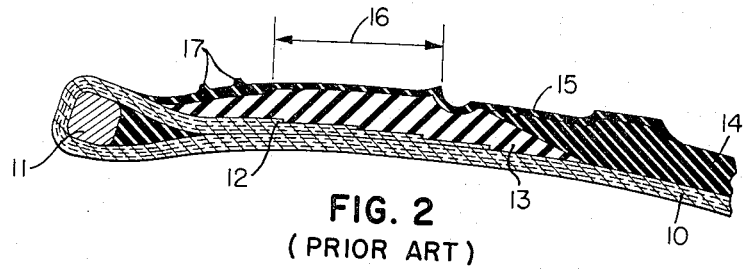
FIGURE 2 shows a similar cross-section after the prior art tire has been vulcanized.

FIGURE 2 sets forth the conventional prior art tire of FIGURE 1 after it has been vulcanized. The configuration of the mold into which the uncured tire was placed has created ribs such as 17 and a buffing area 16. The cured tire is then mounted on appropriate grinding apparatus where the cover-strip 15 is partially removed to expose cured white sidewall strip 13. In this manner a uniform line is established between the black sidewall material and the decorative white material lying thereunder.

Figure 3:
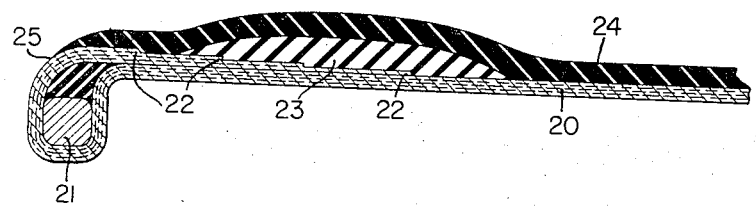
FIGURE 3 is a cross-sectional view showing the lay-up of the present invention.

FIGURE 3 shows the initial lay-up of the present invention. The reinforcement layers 20 are placed on a tire building drum in a manner similar to that described in FIGURE 1. A bead ring 21 is then positioned near the end of reinforcement layer 10. The reinforcement is wrapped around the bead and is positioned in contact with the sidewall of the tire carcass. The ends are tapered as at 22 in order to minimize the offset that would result if all layers of reinforcement were to end at the same place. A layer of white sidewall stock 23 is positioned over the reinforcement layers and stitched into firm contact with the tire carcass. The width of white sidewall stock 23 is less than that required in the prior art tire as described in FIGURES 1 and 2. After white sidewall stock 23 is in position tread stock 24 is positioned on the cylindrical tire carcass. The tread stock extends in width so that it also provides the rubber for the tire sidewalls. In the present invention tread stock 24 extends laterally so that it covers entirely the white sidewall stock 23. Stock 24 terminates at the bead area as shown at 25 in FIGURE 3.

Figure 4:
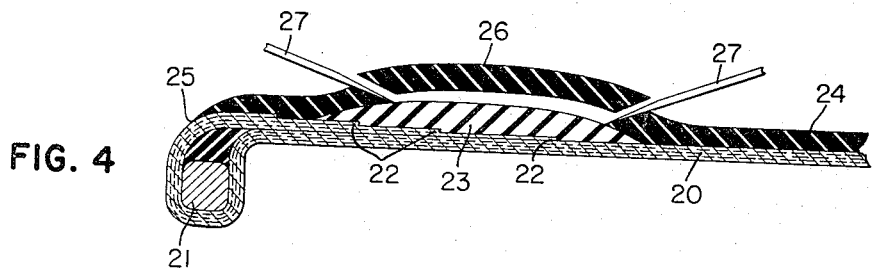
FIGURE 4 is a cross-section showing the black sidewall material that has been cut away from the underlying white stock.

FIGURE 4 is a cross-section similar to FIGURE 3 and shows a section 26 being cut away by knives 27. Knives 27 will be more fully described hereinafter. Portion 26 of sidewall tread stock 24 is then removed from the tire carcass while it is still mounted on the tire building drum. Knives 27 are set to cut entirely through stock 24, however, they do not unduly multilate white sidewall stock 23.

Figure 5:
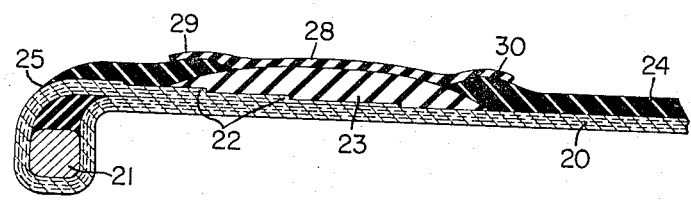
FIGURE 5 is a cross-section showing the incorporation of a thin black cover-strip.

FIGURE 5 shows a cross-sectional view of the lay-up of FIGURE 4 after thin black strip 28 has been positioned. Strip 28 is made from non-staining cover-strip, or over-lay stock, and is calendered until it has a thickness in the range of .020 to .040 inch. Strip 28 is laid over white sidewall stock 23 and also overlaps black stock 24 at 29 and 30.

Figure 6:
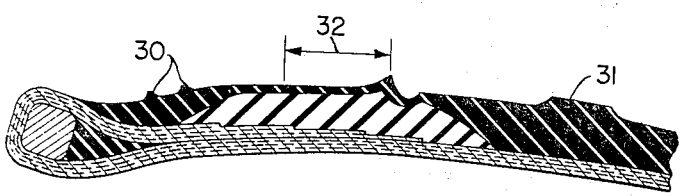
FIGURE 6 is a cross-section showing the completely vulcanized tire prior to the grinding of the white sidewall area.

FIGURE 6 is a cross section of the lay-up of FIGURE 5 after the tire has been vulcanized. Ribs 30 and 31 and buffing area 32 are the result of the mold configuration. Section 32 of black strip 28 is removed by the application of a grinding wheel.

Figure 7:
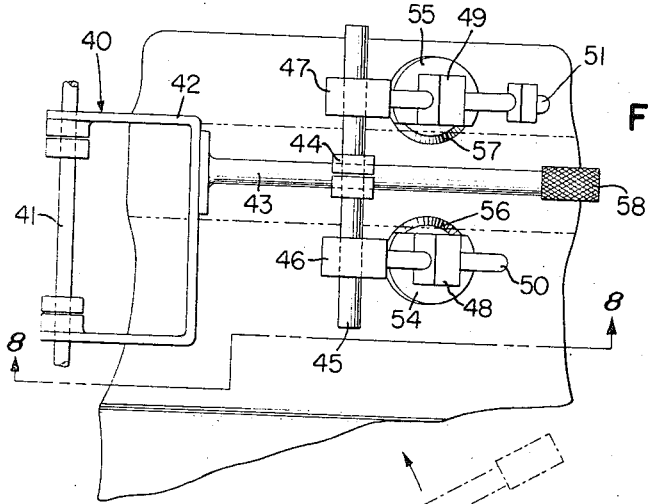
FIGURE 7 shows a plan view of the apparatus utilized in cutting away the black stock from the uncured tire.

FIGURE 7 shows a plan view of the apparatus useful in severing the black sidewall stock from the area containing the white sidewall stock. A cutting assembly is represented at 40. The assembly 40 is mounted on a tire building machine (not shown) so that it can engage a tire on a tire building drum. Support shaft 41 represents the immovable portion of the tire building machine.

Figure 8:
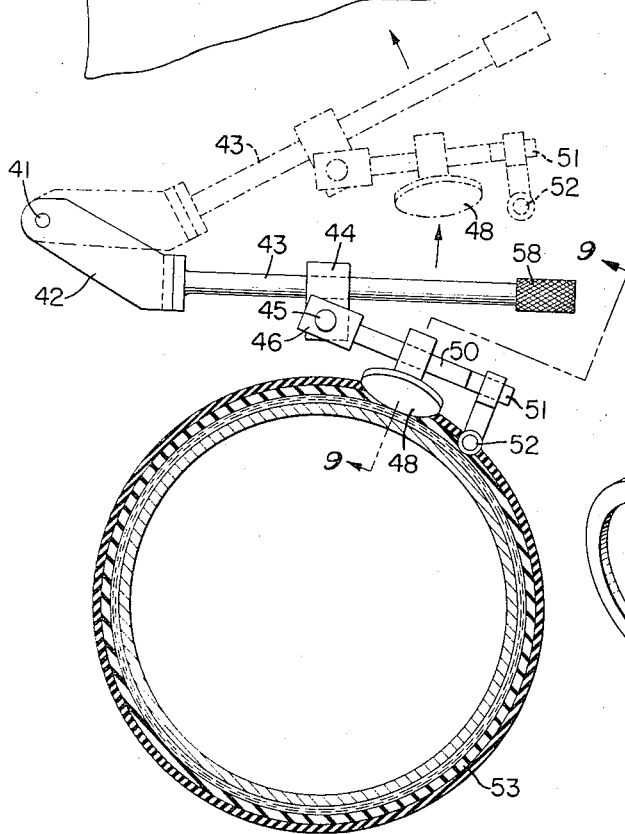
FIGURE 8 is a view depicting the cutting apparatus of FIGURE 7.

FIGURE 8 is a sideview taken along the lines 8—8 of FIGURE 7. Assembly 40 consists of a yoke member 42 that is pivotally connected to rigid member 41. Attached to yoke 42 is shaft 43. Shaft 43 serves as a mounting bar for the remainder of the cutting assembly and also acts as a handle for manipulating the mechanism during the tire building operation. Block 44 is slidably attached to shaft 43 and carries mounting bar 45 best seen in FIGURE 7. Mounting bar 45 has movably attached thereto joints 46 and 47 that can be seen in FIGURE 7. Joints 46 and 47 are adjustable so that they can be positioned along the length of mounting bar 45. Joints 46 and 47 also are rotatable for adjustment purposes around bar 45. Knife head assemblies 48 and 49 are attached to rods 50 and 51 that protrude from joints 46 and 47. Assemblies 48 and 49 are similar to joints 46 and 47 in that they can be positioned axially along and can rotate relative to their respective support rods 50 and 51. Rod 51 contains a positioning wheel 52 for following the contour of the tire carcass to control depth of cut.

Figure 9:
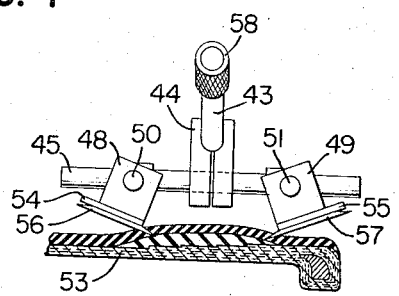
FIGURE 9 is an end view taken along the lines 9—9 of FIGURE 8.

FIGURE 9 is an end view taken along lines 9—9 of FIGURE 8 and shows knife head assemblies 48 and 49 in cutting position on tire carcass 53 and which cutting position insures that a strip cut by and between the knives will be of less or decreasing width as the depth of cut by the knives increases. As will also be seen in FIGURE 4 the knives 27 cut the strip 26 wider at its outer surface than at its inner surface. Assemblies 48 and 49 contain knife guards 54 and 55, as well as knives 56 and 57. The knife guards protect the knife edges so that only the portion used is protruding beyond the knife guard. As the protruding portion of knives 56 and 57 becomes dull they may be rotated until a sharp surface is exposed. A handle 58 is located on the end of shaft 43.

Figure 10:
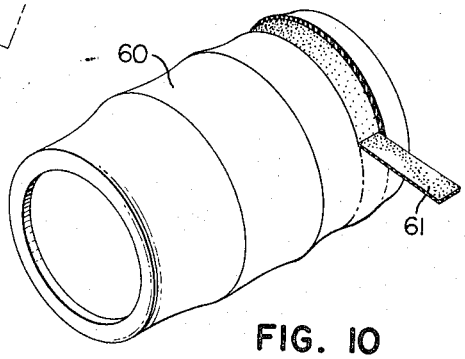
FIGURE 10 is an isometric view showing the cut black stock being removed from the tire carcass.

FIGURE 10 is an isometric view of an uncured tire carcass 60 showing a strip of black sidewall material 61 being removed after it has been severed by the cutting action of the knives shown in the apparatus above.

A tire made according to the above disclosure provides a cost savings in that the amount of white sidewall stock is reduced by approximately 40% and the amount of cover strip compound is reduced by approximately 60%. Another important savings is realized in the standardization of tread dies because the conventional white sidewall tread die can be eliminated. Other savings are realized by standardization of white sidewall dies, which omits many die changes now required to obtain the many different widths and contours needed for the present construction. Standardization of white sidewalls and coverstrips should also reduce the amount of space necessary to provide storage for the large inventory of different widths and contours now required for the present production.

While certain representative embodiments and details have been shown for the purpose of illustrating the invention, it will be apparent to those skilled in this art that various changes and modifications may be made therein without departing from the spirit or scope of the invention.

What is claimed is:
1. The method of building a white sidewall tire comprising the steps of;
   (1) Positioning reinforcement cord layers on a tire building drum,
   (2) Laying a strip of white sidewall stock over the cord layers so that it will be located in the sidewall area of the finished tire,
   (3) Superposing over the cord layers and white stock a layer of tread stock that extends in one piece from the tread area to the bead area,
   (4) Cutting a strip of tread stock located over the white stock with at least two circumferential cuts,
   (5) Removing the tread stock from between the circumferential cuts adjacent the white stock,
   (6) Positioning a thin layer of black stock over the cut away portion of the tread stock adjacent the white stock,
   (7) Curing the tire so that the elastomer layers and reinforcement layers are united, and
   (8) Removing a selected width of the thin black stock from the white stock.

2. The method of building a white sidewall tire comprising the steps of;
   (1) Positioning a strip of white sidewall stock around and in contact with the circumference of partially built tire carcass,
   (2) Laying over the white sidewall stock a piece of black stock having a width greater than that of the white stock,
   (3) Removing a portion of the black stock from over the white stock that is of less width than the white stock,
   (4) Laying over the white stock a thin strip of black stock,
   (5) Curing the tire to unite the layers in the desired final configuration, and (6) Removing a selected width of the black sidewall covering to expose the underlying white sidewall.

3. The method of building a white sidewall tire comprising the steps of;
(1) Laying over an already positioned white sidewall stock a piece of black stock that has a width extending from the bead to the tread,
(2) Removing a width of black stock overlying the white stock,
(3) Adding a thin width of black stock over exposed white stock, and thereafter
(4) Curing the tire to final configuration.

4. The method of claim 2 wherein the thin strip of black stock has a thickness in the range of .020–.040 inch.

5. The method of claim 2 wherein the thin black stock has a width greater than the removed portion of the sidewall stock.

6. In an apparatus for building a white sidewall tire the improvement comprising a cutting assembly for use on a tire building drum, means for moving the cutting assembly toward and away from one sidewall of, a tire carcass mounted on the tire building drum, means for supporting a pair of knives on the cutting assembly, in adjustably fixed spaced and angular relation to one another with each of said knives oriented angularly with respect to the rotational axis of said drum, means to control the depth of cut limit position of the cutting edge of the knives with respect to the tire carcass, and means to adjust the distance between respective cuts made on the tire carcass whereby said knives cut a strip therebetween of width decreasing with increasing depth of cut.

7. In an apparatus for building a white sidewall tire, the combination of a framework supporting a tire building drum, the improvement comprising a cutting assembly supported by the framework and in close proximity to the drum, a pivotal connection coupling the cutting assembly to the framework thus permitting a movement to and from the drum surface, at least a portion of the assembly in the form of a shaft and terminating with a handle, said shaft adapted to receive a movable cross-member held in clampable position substantially perpendicular to the longitudinal direction of the shaft, attachment blocks adjustably connected to the cross-member, rods cantilevered from the attachment blocks and having slidably and rotatably mounted thereon knife holding blocks, the knives so attached to the blocks that the distance from the knife edge to the rod surface is adjustable, and a positioning cam supported from one of the rods and located on the end remote from the rod attachment point thus permitting the depth of penetration of the knives to be controlled.

8. An apparatus as set forth in claim 7 wherein the knives are rotatable.

9. An apparatus as set forth in claim 7 wherein guards are positioned adjacent the knives.

References Cited

UNITED STATES PATENTS

| | | | |
|---|---|---|---|
| 1,131,760 | 3/1915 | Whalen | 156—399 |
| 1,255,073 | 1/1918 | Abbott | 156—399 |
| 1,741,208 | 12/1929 | Swern | 156—128 |
| 1,763,568 | 6/1930 | Templeton | 156—399 X |
| 1,940,077 | 12/1933 | Coe | 156—128 X |
| 2,009,524 | 7/1935 | Schmidt | 156—96 X |
| 2,262,135 | 11/1941 | Carlin | 156—394 |
| 2,761,489 | 9/1956 | Kraft | 156—116 |
| 2,789,616 | 4/1957 | Cathbertson et al. | 156—116 X |
| 3,285,314 | 11/1966 | Roberts | 156—116 X |

FOREIGN PATENTS 1,342,575  9/1963  France.

EARL M. BERGERT, *Primary Examiner.*
CLIFTON B. COSBY, *Examiner.*